United States Patent
Fernandez Espasa et al.

(10) Patent No.: US 10,422,665 B2
(45) Date of Patent: Sep. 24, 2019

(54) ADJUSTING EMULATED ENCODER FREQUENCIES

(71) Applicant: Hewlett-Packard Development Company, L.P., Houston, TX (US)

(72) Inventors: Cèsar Fernandez Espasa, San Diego, CA (US); Ajin Thapa, San Diego, CA (US); Mark C. Graham, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 155 days.

(21) Appl. No.: 15/519,802

(22) PCT Filed: Oct. 28, 2014

(86) PCT No.: PCT/US2014/062617
§ 371 (c)(1),
(2) Date: Apr. 17, 2017

(87) PCT Pub. No.: WO2016/068875
PCT Pub. Date: May 6, 2016

(65) Prior Publication Data
US 2017/0254677 A1    Sep. 7, 2017

(51) Int. Cl.
| G06F 19/00 | (2018.01) |
| G01D 5/244 | (2006.01) |
| G01P 3/50 | (2006.01) |
| G01D 5/347 | (2006.01) |
| G01D 5/12 | (2006.01) |
| G01P 3/64 | (2006.01) |
| G01P 21/02 | (2006.01) |

(52) U.S. Cl.
CPC .......... *G01D 5/24476* (2013.01); *G01D 5/12* (2013.01); *G01D 5/34746* (2013.01); *G01P 3/50* (2013.01); *G01P 3/64* (2013.01); *G01P 21/02* (2013.01)

(58) Field of Classification Search
CPC ......... A63H 17/32; A63H 19/10; A63H 19/14
USPC ................................ 702/150, 155, 182–185
See application file for complete search history.

(56) References Cited

U.S. PATENT DOCUMENTS

| 5,820,007 A | 10/1998 | Crowley |
| 5,979,732 A | 11/1999 | Crowley et al. |
| 6,155,669 A | 12/2000 | Donahue et al. |
| 6,364,443 B1 | 4/2002 | Katano et al. |
| 7,129,858 B2 | 10/2006 | Ferran et al. |
| 7,827,914 B2 | 11/2010 | Fernandez et al. |
| 8,714,691 B2 | 5/2014 | Chen et al. |
| 8,833,904 B2 | 9/2014 | Duke et al. |
| 2003/0037690 A1 | 2/2003 | Dreher et al. |
| 2006/0086275 A1 | 4/2006 | Fernandez et al. |

(Continued)

OTHER PUBLICATIONS

Harriman, Doug. "Control systems challenges in the hp personal ink jet printing application." In American Control Conference, 2005. Proceedings of the 2005, pp. 1138-1141. IEEE, 2005.

*Primary Examiner* — Edward Raymond
(74) *Attorney, Agent, or Firm* — Brooks Cameron & Huebsch PLLC

(57) ABSTRACT

Adjusting emulated encoder frequencies in an example embodiment can include determining a difference between an encoder count and a theoretical encoder count and adjusting a frequency of an emulated encoder signal to mitigate at least some of the difference between the encoder count and the theoretical encoder count.

15 Claims, 4 Drawing Sheets

(56) References Cited

U.S. PATENT DOCUMENTS

2006/0290770 A1\* 12/2006 LeBlanc .................... B41J 2/37
                                                                 347/188
2007/0019009 A1     1/2007 Kang et al.
2011/0218760 A1     9/2011 Takahama et al.

\* cited by examiner

ADJUSTING EMULATED ENCODER FREQUENCIES

BACKGROUND

Industrial print systems may include a conveying means to transport media to the printer. A speed of the media may be monitored during the print process to help achieve a desired quality of print output. For example, media speed may be monitored using a mechanical encoder or an optical sensor.

DETAILED DESCRIPTION

With increasing pressure on organizations to improve their performance, the organizations may seek to increase efficiencies of services and/or products provided, for instance, by pursuing improved performance of printers. Industrial print systems may include a conveying mechanism, such as continuous belts, to transport media (i.e., print media) to the printer. A speed of the media along the conveying mechanism may be monitored during the print process to help achieve a desired quality of print output. For example, the speed of the media may be tracked using mechanical systems such as those including a mechanical encoder and/or an optical sensor. However, such mechanical systems may not deliver a desired level of accuracy, among other difficulties.

Moreover, deviations from a desired level of accuracy, such as those resulting from mechanical and/or digital systems associated with tracking and/or influencing media speed, may be propagated (e.g., increase in magnitude) over the course of a print job(s). For example, cumulative dot placement error (i.e., drift) may occur due to limitations associated with accurately determining a media speed (e.g., discrete controls, etc.), variations in a speed of media itself (e.g., variations due to roller run out, etc.), and/or limitations associated with frequency generation based on a tracked media speed, among other sources of drift. Such drift may be particularly evident when employing discrete controls like emulated encoder frequencies in conjunction with a printer undergoing continuous printing (e.g., continuous web-printing of a print job that does not have gaps between pages) that may propagate drift over the course of a print job(s).

In contrast, examples of the present disclosure include methods, systems, and computer-readable media with executable instructions stored thereon for adjusting emulated encoder frequencies. Adjusting emulated encoder frequencies can, for example, include determining a difference between an encoder count and a theoretical encoder count and adjusting a frequency of an emulated encoder signal to mitigate at least some of the difference between the encoder count and the theoretical encoder count. Advantageously, adjusting emulated encoder frequencies can mitigate (e.g., lessen an amount of and/or negate) drift in contrast to other approaches that do not utilize adjusted emulated encoder frequencies, among other advantages. That is, drift can be identified as a difference between an encoder count and a theoretical encoder count and can be mitigated through adjustment of a frequency of an emulated encoder signal, as described herein.

Figure 1:
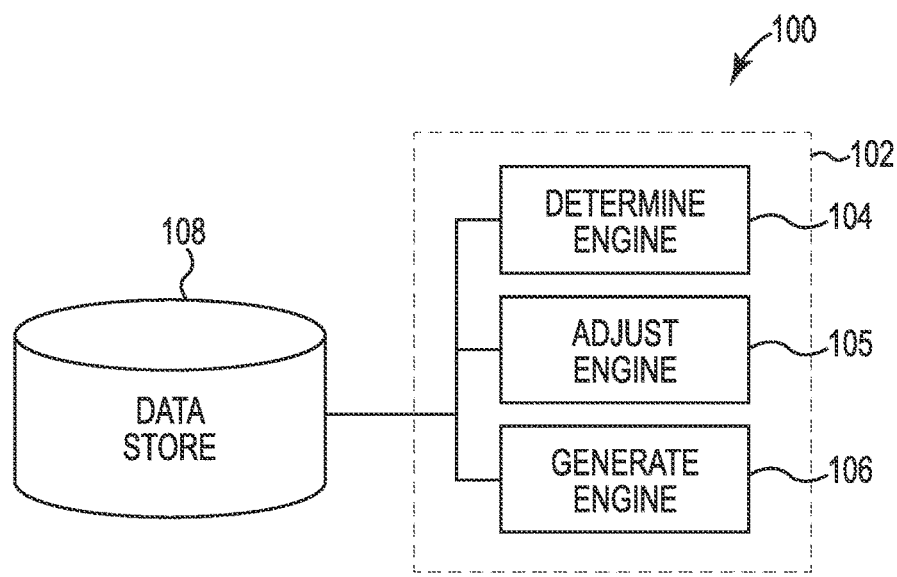
FIG. 1 illustrates a diagram of an example of a system for adjusting emulated encoder frequencies according to the present disclosure.

FIG. 1 illustrates a diagram of an example of a system 100 for adjusting emulated encoder frequencies according to the present disclosure. The system 100 can include a data store 108, an emulated encoder frequency adjustment system 102, and/or a number of engines. The emulated encoder frequency adjustment system 102 can be in communication with the data store 108. The emulated encoder frequency adjustment system 102 can include a number of engines (e.g., a determine engine 104, an adjust engine 105, a generate engine 106, etc.). The emulated encoder frequency adjustment system 102 can include additional or fewer engines than illustrated to perform the various functions described herein.

The number of engines can include a combination of hardware and programming to perform a number of functions described herein (e.g., a determine engine is to determine a difference between an encoder count and a theoretical encoder count, etc.). Each of the engines can include hardware or a combination of hardware and programming designated or designed to execute a module (e.g., a particular module). The programming can include instructions (e.g., software, firmware, etc.) stored in a memory resource (e.g., non-transitory computer-readable medium) as well as a hard-wired program (e.g., logic).

The determine engine 104 is to determine a difference between an encoder count and a theoretical encoder count. An encoder count (e.g., 598 counts) can be a total number of counts of a counter. That is, one count is equivalent to one tick. The total number of counts of the encoder is equal to a total number of ticks (e.g., 598 ticks) generated by an encoder during a time interval. As an example, a time interval can correspond to a time between consecutive top of form TOF marks passing a sensor (e.g., passing by a position capable of being sensed by the sensor) that senses the TOF marks.

A count engine (not shown) can count, via a counter, a total number of ticks generated by an encoder during a time interval between consecutive TOF marks on media passing by the sensor. A counter can be incremented for each of the ticks generated by an encoder (e.g., a media encoding unit) during such a time interval and can be reset upon completion of such a time interval (e.g., reset in response to sensing a next TOF). In this manner, a counter can count respective total numbers of ticks during respective time intervals between successive TOF marks (e.g., from a leading edge of a TOF to a leading edge of another TOF). A total number of ticks generated by the encoder and/or the total number of counts can be provided to the determine engine 104 to promote determining a difference between an encoder count and a theoretical encoder count.

A theoretical encoder count can be calculated in advance of printing based on a desired printing resolution such as 600 dots per inch (DPI) and a specified distance between consecutive TOF marks on the media. For instance, the theoretical encoder count can be calculated as a product of a desired printing resolution and a specified distance between consecutive TOF marks on the media. In an example, a distance between consecutive TOF marks equal to 10 inches at 600 DPI would provide a theoretical encoder count equal to 6000 counts. Such a theoretical distance can be input into a programming and/or firmware, etc., for example, programming of a count engine in advance of starting to print a print job, among other possibilities suitable to promote adjusting emulated encoder frequencies.

Determining a difference between an encoder count and a theoretical encoder count can include determination of a mathematical difference between a value of a counter equal to a total number of ticks generated by an encoder over a given time interval and a value of a theoretical encoder count over the same time interval. Such determination can occur automatically (e.g., without a user input) in response to each incoming TOF, among other possibilities. Determining the difference between the encoder count and the theoretical encoder count can provide an indication of a direction (e.g., increase or decrease) and/or an amount of change in magnitude in the frequency that may promote adjusting a frequency of an emulated encoder signal to mitigate at least some of the difference between the encoder count and the theoretical encoder count. For instance, an adjustment in frequency may correspond to an increase or decrease in one tick or one dot per portion (e.g., page) of a print job. In this manner, an adjustment frequency can be applied to a print job being continuously printed without imparting printing artifacts or other printing inconsistencies associated with adjusting the frequency.

The adjust engine 105 is to adjust a frequency of an emulated encoder signal to mitigate at least some of the difference between an encoder count and a theoretical encoder count. An emulated encoder signal can simulate an encoder signal of a mechanical encoder. A frequency of the emulated encoder signal can be calculated based on a speed of a media, as detailed herein with respect to FIG. 3. For instance, a speed of the media can be determined from signals received from a sensor that sense visible and/or invisible marks on media. Examples of invisible marks include ultraviolet (UV) marks, infrared (IR) marks, magnetic marks, and/or heat marks, among other invisible marks.

While an encoder signal emulator can generate a set of discrete frequencies such as those suitable to emulate an encoder signal, the digital signal generator may not be able to generate an infinite number of frequencies. Thus, a desired frequency corresponding to a determined speed of a media, as detailed herein with respect to FIG. 3, may not be available for generation by an encoder signal emulator. In such a case, the desired frequency may be rounded up in frequency or down in frequency to a frequency that the encoder signal emulator can generate that is closest to the desired frequency. However, since the frequency is not exactly equal to the desire printing frequency an amount of error (e.g., a difference between a desired frequency and a frequency of an emulated encoder signal generated by an encoder signal emulator) may be imparted into a printing process. This error, among other sources of error including those described herein, can be propagated over the course of a print job(s) as drift.

To mitigate drift, the adjust engine 105 can adjust a frequency of the emulated encoder signal (e.g., a reference frequency and/or an unadjusted frequency based on a media speed that does not account for drift) by rounding the frequency up or down depending upon the difference of the encoder count being below or above the theoretical encoder count. For instance, a frequency can be adjusted by rounding up or rounding down a next closest magnitude of frequency capable of being generated by an encoder signal emulator to comparatively increase or decrease, respectively, a resultant encoder count. Put another way, a frequency of an emulated signal can be increased or decreased and sent to a printer to at least partially mitigate the difference between the encoder count and the theoretical encoder count. Such frequency adjustment can lead to mitigation of drift experienced by a printer, while maintaining a dot placement error at a desired value (e.g., at or about zero dot placement error).

The generate engine 106 is to generate the emulated encoder signal at an adjusted frequency. Generation can occur in response to receipt of an adjusted frequency from the adjust engine 105, among other possibilities.

Figure 2:
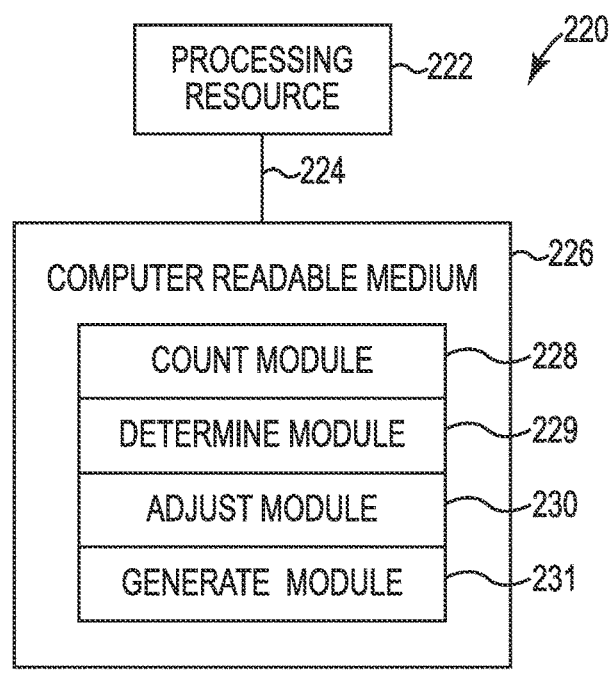
FIG. 2 illustrates a diagram of an example of a computing device according to the present disclosure.

FIG. 2 illustrates a diagram of an example of a computing device for adjusting emulated encoder frequencies according to the present disclosure. The computing device 220 can utilize software, hardware, firmware, and/or logic to perform a number of functions described herein.

For example, the computing device 220 can be a combination of hardware and instructions for adjusting emulated encoder frequencies. The hardware, for example can include a processing resource 222 and/or a memory resource 226 (e.g., computer-readable medium (CRM), data store, etc.). A processing resource 222, as used herein, can include a number of processors capable of executing instructions stored by a memory resource 226. Processing resource 222 can be integrated in a single device (e.g., a printer) or distributed across multiple devices (e.g., printing systems, and/or servers). The instructions (e.g., computer-readable instructions (CRI)) can include instructions stored on the memory resource 226 and executable by the processing resource 222 to implement a desired function (e.g., determine a difference between an encoder count and a theoretical encoder count, etc.). Processing resource 222 may be analogous to processing resource 322 and memory resource 226 may be analogous to memory resource 326.

The memory resource 226 can be in communication with a processing resource 222. A memory resource 226, as used herein, can include a number of memory components capable of storing instructions that can be executed by processing resource 222. Such memory resource 226 can be a non-transitory CRM. Memory resource 226 can be integrated in a single device or distributed across multiple devices. Further, memory resource 226 can be fully or partially integrated in the same device as processing resource 222 or it can be separate but accessible to that device and processing resource 222. Thus, it is noted that the computing device 220 can be implemented as part of or in conjunction with the systems and/or printing systems, as described herein.

The memory resource 226 can be in communication with the processing resource 222 via a communication link (e.g., path) 224. The communication link 224 can be local or remote to a computing device associated with the processing resource 222. Examples of a local communication link 224 can include an electronic bus internal to a computing device where the memory resource 226 is one of volatile, non-volatile, fixed, and/or removable storage medium in communication with the processing resource 222 via the electronic bus.

The memory resource 226 can include a number of modules such as a count module 228, a determine module 229, an adjust module 230, a generate module 231, etc. The number of modules 228, 229, 230, 231 can include CRI that when executed by the processing resource 222 can perform a number of functions. The number of modules 228, 229, 230, 231 can be sub-modules of other modules. For example, the count module 228 and the determine module 229 can be sub-modules and/or contained within the same computing device. In another example, the number of modules 228, 229, 230, 231 can comprise individual modules at separate and distinct locations (e.g., CRM, etc.).

Each of the number of modules 228, 229, 230, 231 can include instructions that when executed by the processing resource 222 can function as a corresponding engine, including those as described herein. For example, the adjust module 230 can include instructions that when executed by the processing resource 222 can function as the adjust engine 105, for instance, to adjust a frequency of an emulated encoder signal to mitigate at least some of the difference between an encoder count and a theoretical encoder count. Similarly, the count module 228 can function as the count engine (not shown) to count a total number of ticks generated by an encoder during a time interval between consecutive TOF marks on media passing by the sensor.

The count module 228 can include instructions that when executed by the processing resource 222 can count, via a counter, a total number of ticks generated by an encoder during a time interval between consecutive TOF marks on media passing by a sensor included in the encoder. The encoder count can be reset with each subsequent TOF mark passing by the sensor included in the encoder and/or a respective total number of ticks can be counted by the counter for each respective interval between two consecutive TOF marks passing by the sensor included in the encoder. Put another way, a particular encoder count (e.g., equal to a particular total number of ticks) can be counted between each subsequent TOF mark passing by the sensor of the encoder. However, the present disclosure is not so limited. That is, in some examples, a total number of ticks by the encoder between two or more consecutive TOF marks or two or more non-consecutive TOF marks can be counted.

The determine module 229 can include instructions that when executed by the processing resource 222 can determine a difference a between an encoder count and a theoretical encoder count. For example, the determine module 229 can determine a difference between an encoder count from the count engine 228 and a theoretical encoder count.

The adjust module 230 can include instructions that when executed by the processing resource 222 can adjust a frequency of an emulated encoder signal to mitigate at least some of the difference between an encoder count and a theoretical encoder count. Adjustment of a frequency of an emulated encoder signal can, in some examples, occur automatically (e.g., without user interaction and/or inputs) to remediate or otherwise mitigate at least some of the difference between the encoder count and the theoretical encoder count. Conversely, when a difference between an encoder count and a theoretical encoder count does not exist, is not statistically significant, and/or is with a desired range (e.g., within a desired margin of difference between an encoder count and a theoretical encoder count) then a frequency of an emulated signal can be maintained (i.e., is not adjusted). The generate module 231 can include instructions that when executed by the processing resource 222 can generate an emulated encoder signal, via an encoder signal emulator, at the adjusted frequency.

Figure 3:
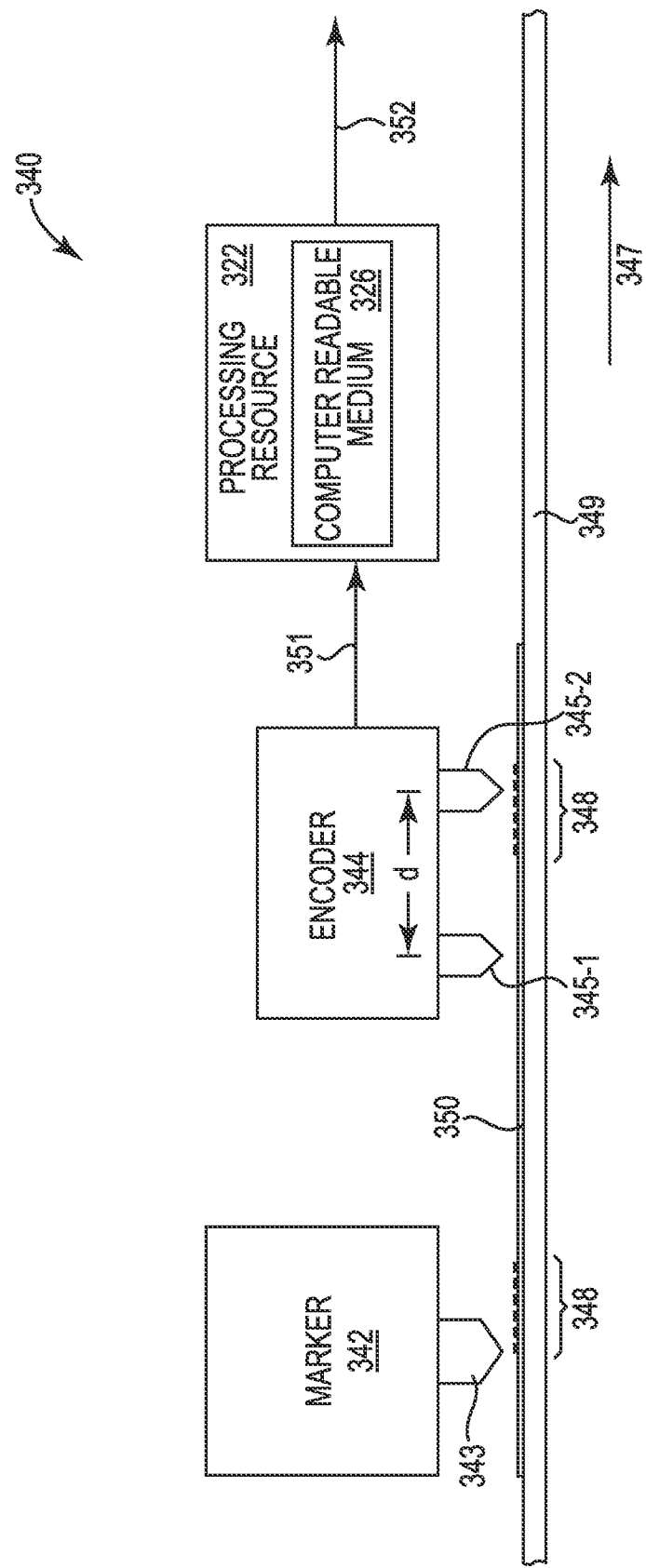
FIG. 3 illustrates an example of a printing system in which various example processes can be implemented for adjusting emulated encoder frequencies according to the present disclosure.

FIG. 3 illustrates printing system 340 in which various example processes can be implemented for adjusting emulated encoder frequencies according to the present disclosure. The printing system 340 is shown to include a marker 342, an encoder 344, a processing resource 322 and a memory resource 326.

The marker 342 comprises an applicator 343 such as a print head or other suitable device that is to apply invisible and/or invisible marks 348 to media, such as media 350 (e.g., paper), that is delivered by a media belt 349 or other suitable device to convey the media (in a direction of travel of media 347) to a printer (not shown). The marker 342 can include a printer that prints invisible marks on the media 350. For example, the marker 342 can print ink that can be detected by an optical sensor when illuminated with ultraviolet (UV) or infrared (IR) light (i.e., UV or IR ink). To cite another example, the marker 342 can print ink that includes magnetic material that can be detected with a magnetic sensor. In other examples, the applicator 343 can include a heating device that applies heat to the media 350 in discrete portions of the media (i.e., heat "marks") that can be detected with a thermal sensor. Although particular examples for the marker 342 have been described, the present disclosure is not so limited. Rather, the marker 342 is to apply invisible marks that cannot be seen with the unaided human eye, but which can be detected with an appropriate sensor. In addition to increasing the accuracy of the media speed determination and enabling a wider range of print resolutions, the printing system 340 is contactless and comprises further no moving parts that can wear out or damage the media belt.

Figure 4:
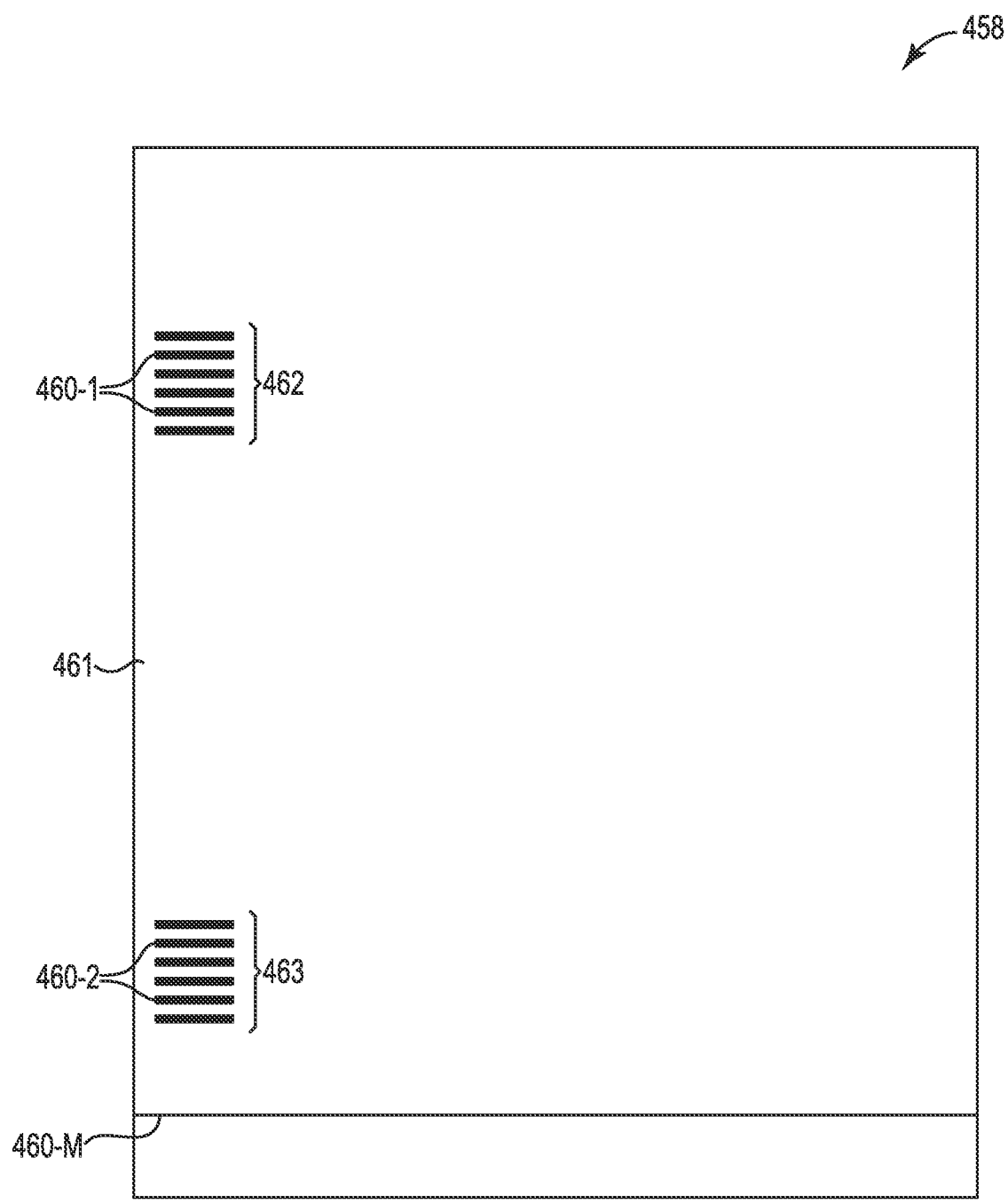
FIG. 4 illustrates a schematic view of an example of a sheet of media including various marks suitable for adjusting emulated encoder frequencies according to the present disclosure.

Regardless of the type of mark used (i.e., ink, magnetic heat, other), a plurality of marks can be applied to the media 350. For example, each unit (e.g., page) of media 350 can be marked with a group(s) of marks. Such functionality is illustrated in FIG. 4, which shows an example unit of media 458 after marking by the marker 342. That is, FIG. 4 illustrates a schematic view of an example of a sheet of media including various marks suitable for adjusting emulated encoder frequencies according to the present disclosure. As is indicated in FIG. 4, the media 458 comprises two groups of marks 462 and 463, each comprising a plurality of individual marks 460-1, 460-2, respectively. Although the marks 460-1, 460-2, are represented as visible marks on the media 458 in FIG. 2, these marks are actually invisible to the unaided human eye. Notably, mark 460-M is a TOF mark that can include a rectangle or other shape (illustrated as a horizontal line for ease of illustration) of a particular color (e.g., black), among other possible types of TOF marks, that is visible and/or invisible to an unaided human eye and can be detected with an appropriate sensor. That is, the marks 460-1, 460-2, 460-M, can include combinations of TOF and invisible marks at various locations including those shown on media to promote adjusting emulated encoder frequencies.

In the illustrated example, the invisible marks 460-1, 460-2, each comprise a horizontal line provided along an edge 461 of the media 458. As is described in the following, the provisioning of a plurality of marks in each group 462, 463 can increase the accuracy with which the speed of the media can be determined. The provisioning of separate groups of marks 462, 463 enables the speed of the media to be determined at two different points in time (e.g., in case the media accelerates or decelerates). The provisioning of TOF mark 460-M enables a drift of the speed of the media to be determined, as described herein.

With reference back to FIG. 3, the encoder 344 is positioned downstream from the marker 342 and is to sense or otherwise detect the marks 348 applied to the media 350 by the marking system as the media travels along a direction of travel 347 on the belt 349. Marks 348 may be analogous to the groups of marks 462 and/or 463, as described with respect to FIG. 4. In some examples, the encoder 344 is a media encoder unit (MEU) included in a plurality of MEUs. A MEU refers to device that can produce timing signals (i.e., ticks) to promote printing of a print job and/or promote adjusting emulated encoder frequencies.

As illustrated in FIG. 3, the encoder 344 can include two distinct sensors, 345-1 and 345-2, respectively, which are spaced from each other a specified distance d, among other possible combination and/or total number of sensor(s) that can be include in an encoder(s). Because the distance d is specified, the speed of the media 350 can be determined by identifying the time at which a given mark is sensed by the first sensor 345-1, and then later sensed by the second sensor 345-2. Specifically, the velocity (v) of the media 350 can be determined from the relation:

$$v=d/\Delta t \quad \text{(Equation 1)}$$

where, $\Delta t=(t345\text{-}1-t345\text{-}2)$

The speed determination is made by the processing resource 322. The processing resource 322 receives the signals, from the first sensor and second sensors 345-1, 345-2, respectively, and calculates the speed from those signals. For example, after a series of marks (e.g., group 462 in FIG. 4) are applied to the media 350 by the marker 342, the marks sequentially arrive at the first sensor 345-1. As each mark (e.g., mark 460-1) passes under the first sensor 345-1, the first sensor detects the mark and sends a pulse (e.g., a signal) to the processing resource 322. Therefore, if, in one example, there are six marks in a given group of marks, a pulse train of six pulses is sent to the processing resource 322. That is, such a pulse train can include a plurality of individual pulses that pertain to individual marks. Each pulse can have a peak that corresponds to the center of a mark. Pulses can be sinusoidal (as opposed to square), among other possibilities, given the nature with which the first sensor 345-1 senses the mark as it travels past. For instance, referring to a first pulse in a pulse train, the first sensor 345-1 detects a leading edge of the mark at time t1, the center of the mark at time t2, and the trailing edge of the mark at time t3. In various examples, it may be possible that different pulse shapes are produced depending upon the type of sensor used.

Because the second sensor 345-2 is positioned a short distance (i.e., the distance d in FIG. 3) downstream from the first sensor 345-1, the second sensor 345-2 can detect marks after the first sensor 345-1. Therefore, the second sensor 345-2 generates its own pulse train that includes pulses that are shifted in time relative to the pulses of the first sensor 345-1. The difference between the time at which the first sensor 345-1 detects a given mark and the time the second sensor 345-2 detects the same mark is the time difference At that is used in Equation 1 to calculate the speed of the media 350. For example, such a difference can be equal to the time between the first peak of a first pulse in a first pulse train and a first peak of a first pulse in a second pulse train.

Although a reasonably accurate measurement of the speed of the media 350 could be obtained from just one mark (i.e., one pulse from each sensor), comparatively increased accuracy of results can be obtained when multiple pulses from the first sensor 345-1 are correlated with multiple pulses from the second sensor 345-1. In such a process, the shapes of the pulses in the first pulse train are matched to the shapes of the pulses in the second pulse train, for instance, so that respective peaks of the matched pulses can be correlated with greater accuracy and, therefore, the time difference can be likewise determined with greater accuracy. Although any number of pulses can be correlated in this manner, the greater the number of pulses that are correlated, the greater the accuracy with which the time between arrival of the media 350 at each sensor 345-1, 345-2 can be calculated.

Once the speed of the media 350 has been determined, that speed can be used as input into an encoder signal emulator (not shown) included in the printing system 340, which generates a signal 351 that emulates that of a mechanical encoder. The emulator generates a further pulse train that simulates the pulses that would be sent by a mechanical encoder for each mark of an encoder disk that is sensed. The emulated encoder signal can be created so as to enable substantially any print resolution of which the printer is able to be used in the print process without complex interpolation. Therefore, resolutions between the multiples of an encoder disk resolution can be achieved with relative ease.

The processing resource 322 also controls the operation of the marker 342, and outputs emulated encoder signals such as an adjusted emulated encoder signal 352 that are generated by an encoder signal emulator. The encoder signals are sent to a printer of an industrial print system (not shown). However, for various reasons including those described herein, a printing system may experience drift that can be accounted for by adjusting a frequency of such an emulated encoder signal.

Figure 5:
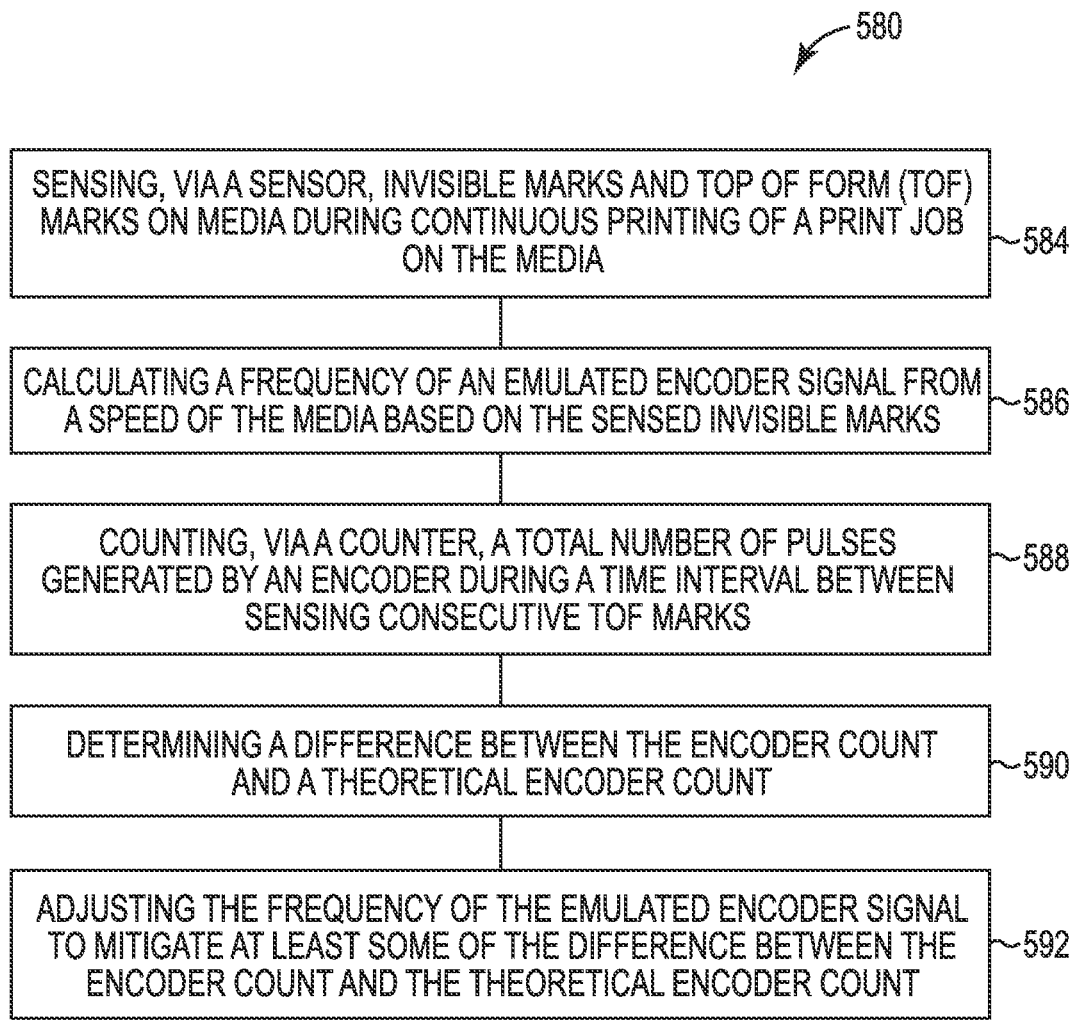
FIG. 5 illustrates a flow diagram of an example of a method for adjusting emulated encoder frequencies according to the present disclosure.

FIG. 5 illustrates a flow diagram of an example of a method for adjusting emulated encoder frequencies according to the present disclosure. The method 580 can include sensing, via a sensor, invisible marks and TOF marks on media during continuous printing of a print job on the media, as shown at 584. As shown at 586, the method 580 can include calculating a frequency of an emulated encoder signal from a speed of the media based on the sensed invisible marks. Calculating a frequency of an emulated encoder signal can occur in response to sensing invisible marks, among other possibilities.

The method 580 can include counting, via a counter, a total number of ticks generated by an encoder during a time interval between sensing consecutive TOF marks, as shown at 588. Counting can include incrementing a counter based on a total number of ticks generated by an encoder during a time interval between sensing consecutive TOF marks and/or storage of the value of the counter.

As shown at 590, the method 580 can include determining a difference between a value of the encoder count and a value of a theoretical encoder count. The method 580 can include adjusting the frequency of the emulated encoder signal to mitigate at least some of the difference between the value of encoder count and the value of the theoretical encoder count, as shown at 592. Adjusting refers to varying and/or otherwise imparting a change in frequency of an emulated encoder signal relative to a previous frequency of the emulated encoder signal (e.g., a frequency calculated based on a determined speed of a media) that mitigates at least some of the difference between the value of the encoder count and the value of the theoretical encoder count.

In some examples, the method 580 can include generating an emulated encoder signal at the adjusted frequency to control a printer continuously printing the print job. Thus, in contrast to other approaches, that utilize interruption(s) of a print job to recalibrate or otherwise alter printing of the print job, the present disclosure can enable continuous printing of a print job and/or adjusting a frequency of an emulated encoder signal to mitigate at least some of the difference between the value of the encoder count and the value of the theoretical encoder count. For instance, the method 590 can, in some examples, include printing at least a portion (e.g., a second portion) of a print job at the adjusted frequency of the emulated signal, while another portion (e.g., a first portion) of the print job can be printed at a non-adjusted frequency.

The method 590 can include adjusting the frequency of the emulated encoder signal where the adjusted frequency corresponds to a rounded value of the encoder count. That is, the method 590 can include rounding a value of the encoder count (e.g., rounding up or rounding down) to mitigate at least some of the difference between the encoder count and the theoretical encoder count, as described herein.

In some examples, a total number of ticks generated by the encoder and/or the total number of counts and/or a theoretical encoder count can be multiplied by a multiplier or otherwise manipulated to provide a desired degree of resolution with respect to the difference between difference between an encoder count and a theoretical encoder count. For example, while an encoder count of 599 at a resolution of 1 count (e.g., corresponding to 1 DPI) can be considered within a desired range such as of +/−1 counts of a theoretical encoder count of 600, it may be desirable to have a comparatively higher resolution realized by comparatively increasing the desired range to be within 16 counts of a theoretical encoder count of 96000. In this manner, while the encoder count of 599 (e.g., 598.8 that has been rounded to 599) may not result in frequency adjustment, the same value when applied at the higher resolution becomes 9581 (e.g., 9580.8) which is greater than +/−16 counts from the higher resolution theoretical encoder count and therefrom can result in adjustment of the frequency of an emulated signal generated based on the same.

In some examples, the method can include displaying an indication of a frequency of an emulated encoder signal, an adjusted frequency of an emulated encoder signal, an encoder count, and/or a theoretical encoder count, among other information. Displaying, for example, can include causing a display in response to receipt of an encoder count, a theoretical encoder count, and/or an adjusted frequency of an emulated encoder signal, among other possibilities to promote adjusting emulated encoder frequencies.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system, comprising:
    a determine engine to determine a difference between an encoder count and a theoretical encoder count;
    an adjust engine to adjust a frequency of an emulated encoder signal to mitigate at least some of the difference between the encoder count and the theoretical encoder count; and
    a generate engine to generate the emulated encoder signal at the adjusted frequency.

2. The system of claim 1, wherein the encoder count is a total number of counts of a counter that is equal to a total number of ticks generated by a media encoder unit during a time interval between top of form (TOF) marks passing a sensor.

3. The system of claim 2, wherein the TOF marks comprise consecutive TOF marks passing the sensor that senses the TOF marks.

4. The system of claim 1, wherein the theoretical encoder count is calculated based on a desired printing resolution and a specified distance between consecutive top of form (TOF) marks on a media.

5. The system of claim 1, wherein the frequency of the emulated encoder signal is calculated based on a speed of a media, and wherein the speed of the media is determined from signals received from sensors that sense invisible marks on media.

6. The system of claim 5, wherein the invisible marks are detectable by the sensors and include at least one of ultraviolet (UV) marks, infrared (IR) marks, magnetic marks, and heat marks.

7. The system of claim 1, wherein the encoder is a media encoder unit.

8. A non-transitory computer readable medium storing instructions executable by a processing resource to cause a device to:
    count, via a counter, a total number of ticks generated by an encoder during a time interval between consecutive top of form (TOF) marks on media passing by a sensor included in the encoder;
    determine a difference between the encoder count and a theoretical encoder count;
    adjust a frequency of an emulated encoder signal to mitigate at least some of the difference between the encoder count and the theoretical encoder count; and
    generate the emulated encoder signal, via an encoder signal emulator, at the adjusted frequency.

9. The medium of claim 8, wherein the emulated encoder signal simulates an encoder signal of a mechanical encoder.

10. The medium of claim 8, wherein an encoder count is counted between each subsequent TOF mark passing by the sensor of the encoder.

11. The medium of claim 8, wherein the frequency is adjusted to maintain the encoder count within a range of the theoretical encoder count.

12. A method, comprising:
    sensing, via a sensor, invisible marks and top of form (TOF) marks on media during continuous printing of a print job on the media;

calculating a frequency of an emulated encoder signal from a speed of the media based on the sensed invisible marks;

counting, via a counter, a total number of ticks generated by an encoder during a time interval between sensing consecutive TOF marks;

determining a difference between a value of the encoder count and a value of theoretical encoder count; and adjusting the frequency of the emulated encoder signal to mitigate at least some of the difference between the value of encoder count and the value of theoretical encoder count.

13. The method of claim 12, including generating the emulated encoder signal at the adjusted frequency to control a printer continuously printing the print job.

14. The method of claim 12, including rounding a value of the encoder count to mitigate at least some of the difference between the value of the encoder count and the value of the theoretical encoder count.

15. The method of claim 14, wherein the adjusted frequency corresponds to the rounded value of the encoder count.

* * * * *